United States Patent [19]

Coleman

[11] Patent Number: 4,987,740
[45] Date of Patent: Jan. 29, 1991

[54] ASSURED VENTING MASTER CYLINDER DIAPHRAGM APPARATUS AND METHOD

[75] Inventor: John R. Coleman, Dayton, Ohio

[73] Assignee: General Motors Corporation, Detroit, Mich.

[21] Appl. No.: 331,999

[22] Filed: Apr. 3, 1989

[51] Int. Cl.$^5$ .............................................. F15B 7/00
[52] U.S. Cl. ........................................ 60/583; 60/586; 220/85 B; 220/203; 92/104
[58] Field of Search ............... 60/583, 585, 586, 587; 220/85 A, 85 B, 203, 209, 367; 92/114; 137/846

[56] References Cited

U.S. PATENT DOCUMENTS

| | | | |
|---|---|---|---|
| 1,784,539 | 12/1930 | Ricker | 220/209 X |
| 2,492,225 | 12/1949 | Kester | 220/203 |
| 3,406,862 | 10/1968 | Donaldson | 222/209 |
| 3,423,939 | 1/1969 | Lewis et al. | 60/587 X |
| 3,517,682 | 6/1970 | Smith | 137/846 X |
| 3,527,376 | 9/1970 | Young | 222/209 |
| 3,948,414 | 4/1976 | Hagerty | 137/846 X |
| 4,165,816 | 8/1979 | Tupper | 220/203 |
| 4,789,608 | 12/1988 | Oswald | 220/367 X |
| 4,896,789 | 1/1990 | Federspiel | 220/367 |

FOREIGN PATENT DOCUMENTS

| | | | |
|---|---|---|---|
| 2458632 | 7/1975 | Fed. Rep. of Germany | 60/585 |
| 1435807 | 5/1976 | United Kingdom | 220/209 |

*Primary Examiner*—Edward K. Look
*Assistant Examiner*—John Ryznic
*Attorney, Agent, or Firm*—Ernest E. Helms

[57] ABSTRACT

A diaphragm for a vented master cylinder reservoir which further includes means for opening the slit thereby assuring venting of the master cylinder reservoir is provided. The slit opening means are configured in such a manner that contact of the slit opening means with the master cylinder cap will cause the diaphragm to be stressed and to elastically deform, therefore assuring the opening of the venting slit.

9 Claims, 2 Drawing Sheets

ASSURED VENTING MASTER CYLINDER DIAPHRAGM APPARATUS AND METHOD

FIELD OF THE INVENTION

The field of the present invention is that of vehicle brake master cylinders with vented brake fluid reservoirs, apparatuses and methods of utilization thereof.

DISCLOSURE STATEMENT

Master cylinder brake fluid reservoirs come in two major types. One type is a nonvented and the other type being a vented master cylinder reservoirs. In the nonvented master cylinder reservoir the reservoir is covered by a flexible diaphragm which provides a variable control volume to accommodate changes in the fluid level within the reservoir.

Typically, the unvented reservoir has a diaphragm held in place by a large rectangular cap which is in turn biased downward by a spring clamp. In an attempt to make the brake fluid reservoir more user friendly in maintenance, the venting type reservoirs were developed. Venting type brake fluid reservoirs often having a screw cap which make servicing the reservoir more convenient. However, the screw cap is often much smaller than the prior nonvented type caps. The diaphragm within the screw cap does not in itself have enough volumetric displacement to accommodate the fluid volume changes within the reservoir. Therefore, the diaphragm and cap are vented.

Care must be taken in vented reservoirs to provide a venting system which allows the reservoir to be vented while at the same time excluding the entrance of foreign particles into the brake fluid. Previously such diaphragms had a small slit approximately. In normal operation the slit is closed preventing the passage of air. It is important for the slit to open whenever there is an excessive pressure within the brake fluid reservoir.

On some occasions, excessive fluid may develop within the fluid reservoir. The flexible diaphragm can be pressed against the flat top of the cap of the fluid reservoir in such a manner that the surface area surrounding the slit will seal against the cap. As a result, venting will not occur as desired. Additionally, entrapment of lubricant upon the diaphragm (in the vicinity of the slit) can sometimes cause the slit of the diaphragm to inadvertently seal shut. Improper venting of the diaphragm could possibly cause excessive pressure within the fluid reservoir causing the brakes to drag.

SUMMARY OF THE INVENTION

To overcome the above-noted difficulties the present invention is brought forth. The present invention provides a diaphragm for a vented master cylinder reservoir which further includes means for opening the slit thereby assuring venting of the master cylinder reservoir. The slit opening means are configured in such a manner that contact of the slit opening means with the master cylinder cap will cause the diaphragm to be stressed and to elastically deform, therefore assuring the opening of the venting slit.

It is the object of the present invention to provide a master cylinder reservoir diaphragm with an assured venting apparatus and a method of utilization thereof.

Further objects and advantages of the present invention can become more apparent to those skilled in the art as the nature of the invention is better understood from the accompanying drawings and a detailed description.

DETAILED DESCRIPTION OF THE DRAWINGS

Figure 5:
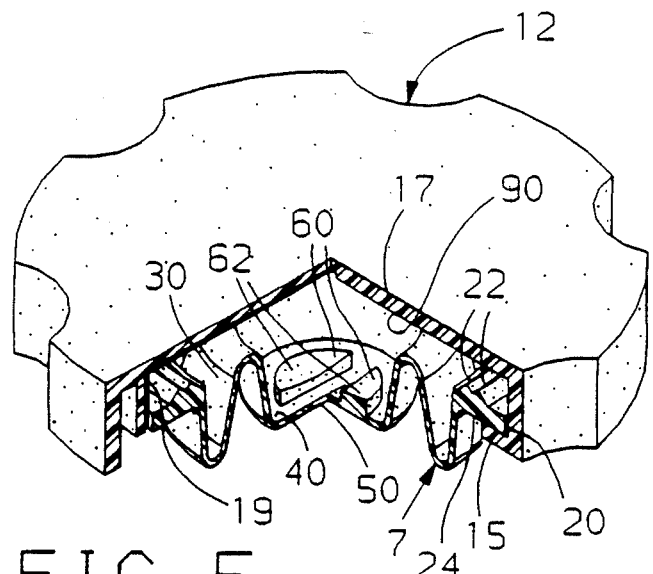
FIG. 5 is a perspective sectional view of the diaphragm illustrated in FIG. 1 installed within a reservoir cap.
Figure 6:
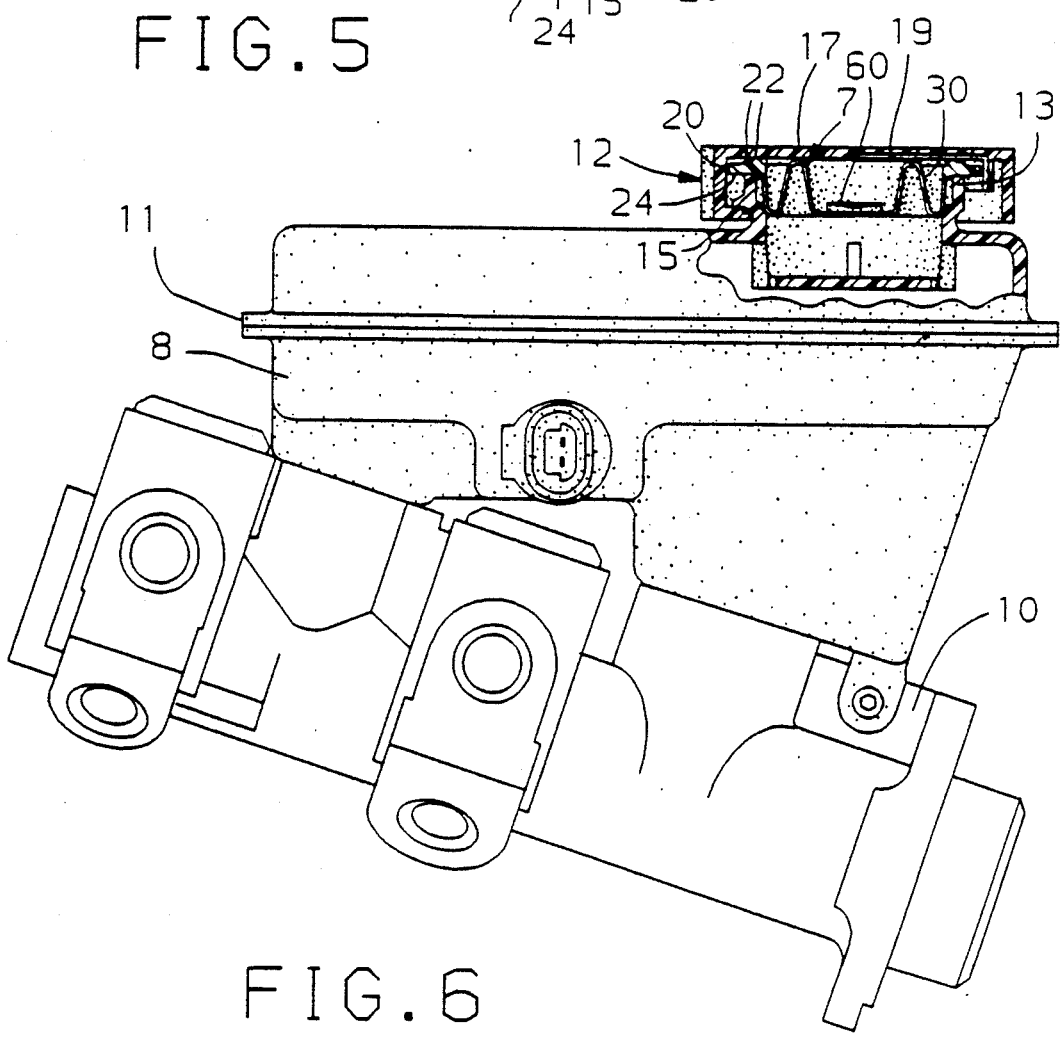
FIG. 6 is a sectional view mainly shown in side elevation of the cap and diaphragm installed upon the reservoir of a master cylinder.

Referring to FIGS. 5 and 6, a vehicle master cylinder 10 has mounted on top a brake fluid reservoir 8. Typically, the master cylinder will be mounted upon an incline to the fire wall of the vehicle (not shown) so that the seam 11 of the reservoir 8 will essentially be in a horizontal position. The reservoir 8 at one end has a screw type cap 12 with a top planar surface 90 (FIG. 5). The cap 12 allows for the replenishment of brake fluid to the master cylinder 10 or brake system.

Referring additionally to FIGS. 1–4, an elastomeric diaphragm 7 according to the present invention has a dual ring 22 rim sealing edge 20. An under side 24 of the sealing edge 20 is provided for mating with the rim top 13 of the reservoir 8 and separates the fluid within the reservoir 8 from the cap 12. The dual ring 22 seals the diaphragm against the top edge (planar surface 90) of the cap 12. When the cap 12 is removed form the reservoir 8 the sealing edge 20 is held by three geometrically spaced ledges 15 of the cap.

Figure 1:
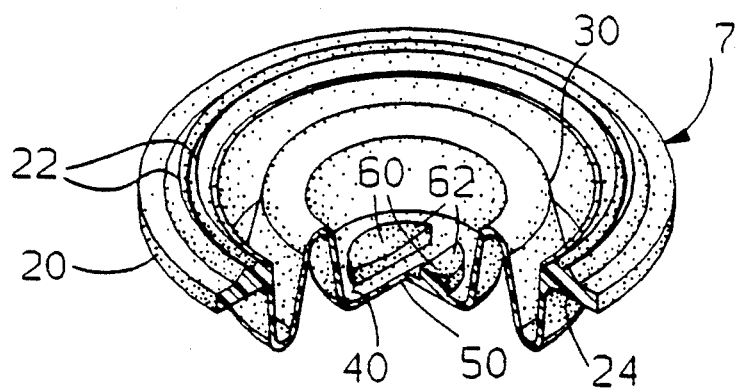
FIG. 1 is a perspective sectional view of a preferred embodiment master cylinder reservoir diaphragm according to the present invention.
Figure 2:
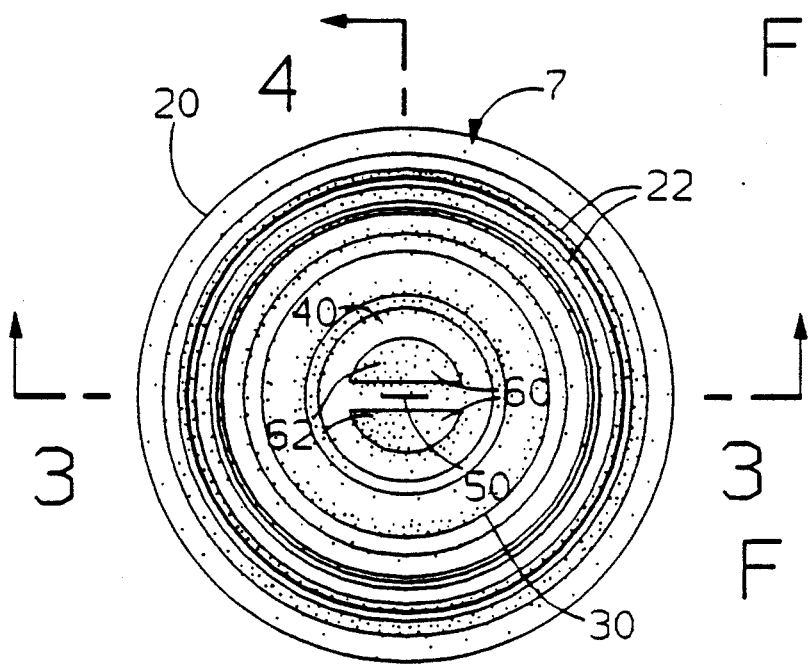
FIG. 2 is a top plane view of the diaphragm shown in FIG. 1.
Figure 3:
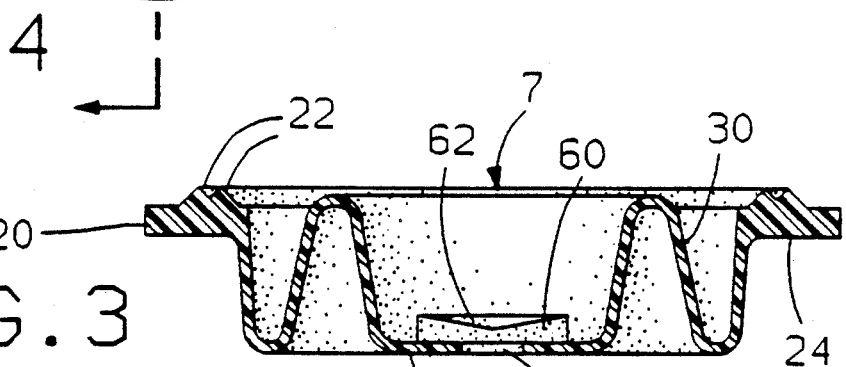
FIGS. 3 and 4 are views taken along lines 3—3 and 4—4, respectively, of FIG. 2.
Figure 4:
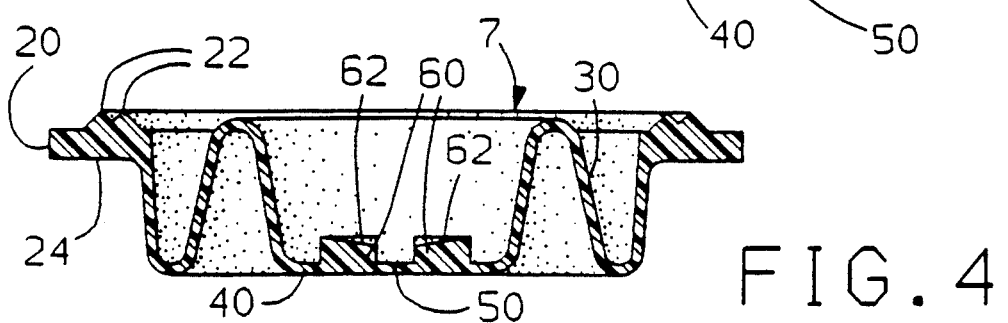

Integrally joined to the sealing edge 20 is a bellows portion 30 of the diaphragm 7. The bellows 30 portion of the diaphragm 7 allows the diaphragm 7 to form a variable control volume above the reservoir fluid. In the middle of the diaphragm 7 is a sheet portion 40 which is integrally joined to the bellows portion 30. The sheet portion covers the fluid within reservoir 8. The sheet portion has at least one slit 50. The slit 50 is normally closed preventing the passage of fluid therethrough. Adjacent on opposed sides of the slit are the slit opening means 60. As best shown in FIG. 2 the slit opening means 60 are moon shaped. The slit opening means 60 have a 5 to 10 degree taper with respect to the sheet portion 40 or top 17 of the cap.

In operation whenever a vacuum forms within the reservoir 8 of a sufficient amount (typically 3.0 psi) the slit 50 is pulled open. An increase of pressure in the master cylinder reservoir, typically due to an increase of temperature and thermal expansion of the brake fluid will cause the sheet portion 30 of the diaphragm 7 to rise upward and vent at approximately 10 psi. If for some reason the slit 50 does not open as desired the slit 50 opening means 60 will contact the cap top 17. Upon contact of the cam opening means 60 with the top 17 (planner surface 90 causing) the slit opening means 60 to stress the sheet portion 30 to elastically deform to assure the opening of the slit 50 and prevent the sealing of the slit 50 against the surface 90. Upon the opening of the slit 50 air will be vented to the atmosphere and out a venting passage 19 provided within the cap 12 until the pressure has been relieved, thereafter the slit 50 will close preventing passage of air or particles. The tapered aspect of the surface 62 of slit opening mean 60 causes additional stress in the sheet portion 30 thereby further assuring the opening of the slit 50 when needed.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A diaphragm for a vehicle brake master cylinder fluid reservoir having a vented cap with a generally planar surface, said diaphragm in combination comprising:
   a sealing edge for mating with said cap and separating said reservoir fluid from said cap;
   a bellows portion integrally joined with said sealing edge allowing said diaphragm to form a variable control volume above said reservoir fluid;
   a sheet portion integrally joined to said bellows portion covering said reservoir fluid, said sheet portion having at least one slit normally closed preventing the passage of fluid through said diaphragm; and
   at least one slit opening means fixably joined to said sheet portion whereby expansion of the fluid pressure below said diaphragm causes said slit opening means to contact said cap planar surface and to elastically stress said sheet portion to elastically deform to open said slit preventing said slit from being sealed on said cap planar surface allowing said master cylinder reservoir to vent to the atmosphere.

2. A diaphragm as described in claim 1 wherein there is at least two slit opening means.

3. A diaphragm as described in claim 1 wherein said slit opening means has a angled surface for contact with said cap.

4. A diaphragm as described in claim 3 wherein said angle is between 5 and 15 degrees.

5. A diaphragm as described in claim 1 wherein said diaphragm is fabricated from one piece of a flexible elastomeric material.

6. A diaphragm for a vehicle brake master cylinder fluid reservoir having a reservoir rim top and a vented screw type cap with a top edge, said diaphragm in combination comprising:
   an elastomeric sealing edge for mating with said reservoir rim top and sealing said diaphragm against the top edge of the cap, said sealing edge separating said reservoir fluid from said cap;
   a bellows portion integrally joined with said sealing edge allowing said diaphragm to form a variable control volume above said reservoir fluid;
   a sheet portion integrally joined to said bellows portion covering said reservoir fluid, said sheet portion having at least one slit normally closed preventing the passage of fluid therethrough; and
   on both sides of said slit, slit opening means fixably joined to said sheet portion having an angled surface with respect to said cap whereby expansion of the fluid below said diaphragm causes said slit opening means to contact said cap to elastically stress said sheet portion to elastically deform to open said slits allowing said master cylinder reservoir to vent to atmosphere.

7. A method for venting a master cylinder fluid reservoir with a vented cap having a planar surface and a diaphragm fixed within said cap, said method in combination comprising:
   sealing said reservoir with the edge of said diaphragm and separating said reservoir fluid from said cap with said diaphragm;
   providing a variable control volume above said reservoir fluid with a bellows portion of said diaphragm;
   covering said reservoir fluid with a sheet portion of said diaphragm integrally joined to said bellows portion of said diaphragm, said sheet portion having one slit normally closed preventing the passage of fluid therethrough;
   elastically stressing said sheet portion to elastically deform to open said slit allowing said master cylinder reservoir to vent to the atmosphere when said pressure within said master fluid reservoir causes said diaphragm to rise by causing a slit opening means positioned on said diaphragm sheet portion to contact said cap whereby said sheet portion of said diaphragm is elastically stressed opening said slit and venting said master cylinder reservoir; and
   preventing said slit from sealing on said cap planar surface with said slit opening means.

8. A diaphragm for a vehicle brake master cylinder fluid reservoir having a vented cap, said diaphragm in combination comprising:
   a sealing edge for mating with said cap and separating said reservoir fluid from said cap;
   a bellows portion integrally joined with said sealing edge allowing said diaphragm to form a variable control volume above said reservoir fluid;
   a sheet portion integrally joined to said bellows portion covering said reservoir fluid, said sheet portion having at least one slit normally closed preventing the passage of fluid through said diaphragm; and
   at least two slit opening means fixably joined to said sheet portion whereby expansion of the fluid pressure below said diaphragm causes said slit opening means to contact said cap and to elastically stress said sheet portion to elastically deform to open said slit allowing said master cylinder reservoir to vent to the atmosphere.

9. A diaphragm for a vehicle brake master cylinder fluid reservoir having a vented cap, said diaphragm in combination comprising:
   a sealing edge for mating with said cap and separating said reservoir fluid from said cap;
   a bellows portion integrally joined with said sealing edge allowing said diaphragm to form a variable control volume above said reservoir fluid;
   a sheet portion integrally joined to said bellows portion covering said reservoir fluid, said sheet portion having at least one slit normally closed preventing the passage of fluid through said diaphragm; and
   at least one slit opening means fixably joined to said sheet portion having an angled surface for contact with said cap whereby expansion of the fluid pressure below said diaphragm causes said slit opening means to contact said cap and to elastically stress said sheet portion to elastically deform to open said slit allowing said master cylinder reservoir to vent to the atmosphere.

* * * * *